(12) United States Patent
Sundrani et al.

(10) Patent No.: US 8,661,175 B2
(45) Date of Patent: Feb. 25, 2014

(54) MULTIPROCESSOR SYNCHRONIZATION USING REGION LOCKS

(75) Inventors: Kapil Sundrani, Clutterbuckganj (IN); Lakshmi Kanth Reddy Kakanuru, Bangalore (IN)

(73) Assignee: LSI Corporation, San Jose, CA (US)

( * ) Notice: Subject to any disclaimer, the term of this patent is extended or adjusted under 35 U.S.C. 154(b) by 273 days.

(21) Appl. No.: 13/151,115

(22) Filed: Jun. 1, 2011

(65) Prior Publication Data

US 2012/0311300 A1    Dec. 6, 2012

(51) Int. Cl.
*G06F 12/00*    (2006.01)
*G06F 13/00*    (2006.01)

(52) U.S. Cl.
USPC ............ 710/240; 710/36; 710/108; 710/200; 711/150

(58) Field of Classification Search
USPC ............................. 710/36, 108, 200; 711/150
See application file for complete search history.

(56) References Cited

U.S. PATENT DOCUMENTS

| | | | |
|---|---|---|---|
| 5,285,528 A | 2/1994 | Hart | |
| 6,842,829 B1 * | 1/2005 | Nichols et al. | 711/147 |
| 7,210,019 B2 * | 4/2007 | Corrado | 711/208 |
| 7,487,278 B2 | 2/2009 | Goldick | |
| 7,783,805 B2 * | 8/2010 | Cometto et al. | 710/200 |
| 8,321,639 B2 * | 11/2012 | Lund et al. | 711/154 |
| 2010/0268904 A1 * | 10/2010 | Sheffield et al. | 711/163 |

* cited by examiner

*Primary Examiner* — Brian Misiura
(74) *Attorney, Agent, or Firm* — Alexander J. Neudeck; Cochran Freund & Young LLC

(57) ABSTRACT

Disclosed is a method of synchronizing a plurality of processors accesses to at least one shared resource. One of a plurality of processors requests an exclusive region lock for a shared resource using a logical block address (LBA) of a dummy target. The LBA is defined in a region map that associates LBAs to shared resources. The exclusive region lock request is inserted as a node in a region lock tree of the dummy target. Access to the shared resource is granted based on a determination whether there is an existing region lock in the region lock tree that is overlaps with the new exclusive region lock request.

19 Claims, 8 Drawing Sheets

| LBA | SHARED RESOURCE |
|---|---|
| 0 | REGION_MAP_FLASH |
| 1 | REGION_MAP_GLOBAL_BUFFER_1 |
| 2 | REGION_MAP_GLOBAL_BUFFER_1 |
| ... | ... |
| N | REGION_MAP_RESOURCE_N |

FIGURE 3

MULTIPROCESSOR SYNCHRONIZATION USING REGION LOCKS

BACKGROUND OF THE INVENTION

Multiprocessor systems use two or more central processing units (CPUs) within a single computer system. Multiprocessor systems have the ability to support more than one processor and/or the ability to allocate tasks between them. There are many variations on this basic theme. Multiprocessor systems may have multiple cores on one die, multiple dies in one package, multiple packages in one system unit, etc. Multiprocessor systems may execute multiple concurrent software processes in a system. To avoid race conditions, multiprocessor systems should synchronize access to data structures, regions of memory, or I/O devices.

SUMMARY OF THE INVENTION

An embodiment of the invention may therefore comprise a method of synchronizing a plurality of processors' accesses to at least one shared resource, comprising: requesting, by one of said plurality of processors, an exclusive region lock for a shared resource using a logical block address (LBA) of a dummy target, said LBA defined in a region map that contains at least one LBA, the at least one LBA in said region map associated with said shared resource; inserting said exclusive region lock request as a node in a region lock tree of said dummy target; and, granting said one of said plurality of processors access to said shared resource based on a determination whether there is a first existing region lock in the region lock tree that is overlapping with said exclusive region lock request.

An embodiment of the invention may therefore further comprise a computer system, comprising: a plurality of processors configured to access at least one shared resource by requesting an exclusive region lock for a shared resource using a logical block address (LBA) of a dummy target; a region map containing said LBA and configured to contain a plurality of LBAs, said region map configured to associate said LBA with said shared resource; a region lock tree of said dummy target configured to receive said exclusive region lock request as a node in said region lock tree of said dummy target; and, said plurality of processors configured to receive access to said shared resource based on a determination whether there is a first existing region lock in the region lock tree that is overlapping with said exclusive region lock request.

BRIEF DESCRIPTION OF THE DRAWINGS

FIG. 3 is an illustration of a region map.

DETAILED DESCRIPTION OF THE EMBODIMENTS

Figure 1:
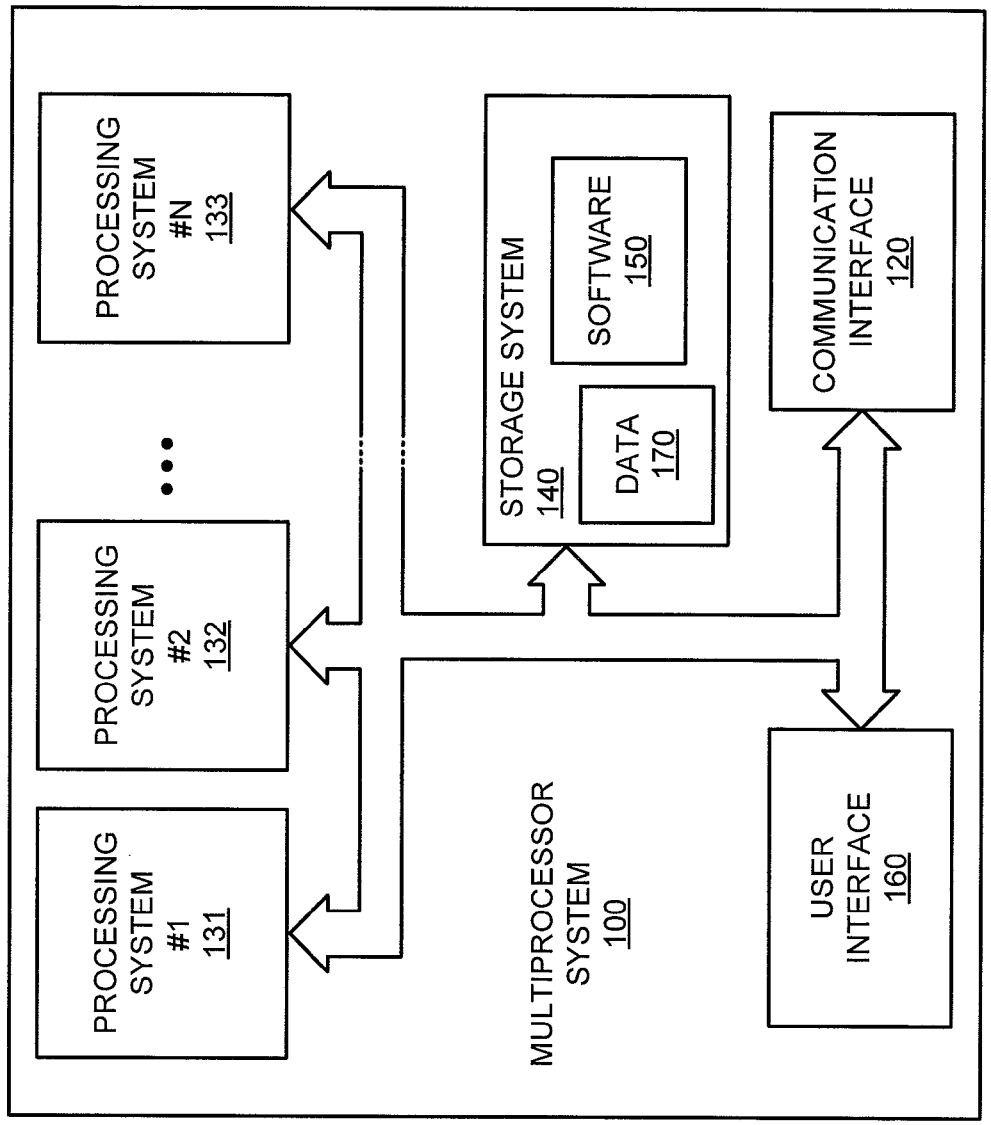
FIG. 1 is a block diagram of a multiprocessor system.

FIG. 1 is a block diagram of a multiprocessor system. The systems, processes, methods, databases, modules, and functions described below may be implemented with or executed by one or more multiprocessor computer systems or in dedicated hardware. The methods described above may be stored on a computer readable medium. Computer system 100 includes communication interface 120, processing system #1 131, processing system #2 132, processing system #N 133, storage system 140, and user interface 160. Processing systems 131-133 are operatively coupled to storage system 140. Storage system 140 stores software 150 and data 170. Processing systems 131-133 are operatively coupled to communication interface 120 and user interface 160. Processing systems 131-133 are operatively coupled to each other. Computer system 100 may comprise a programmed general-purpose computer. Computer system 100 may include one or more microprocessors. Computer system 100 may comprise programmable or special purpose circuitry. Computer system 100 may be distributed among multiple devices, processors, storage, and/or interfaces that together comprise elements 120-170.

Communication interface 120 may comprise a network interface, modem, port, bus, link, transceiver, or other communication device. Communication interface 120 may be distributed among multiple communication devices. Processing systems 131-133 may comprise a microprocessor, microcontroller, logic circuit, or other processing device. Processing systems 131-133 may be distributed among multiple processing devices. Processing systems 131-133 may comprise or use cache memory. User interface 160 may comprise a keyboard, mouse, voice recognition interface, microphone and speakers, graphical display, touch screen, or other type of user interface device. User interface 160 may be distributed among multiple interface devices. Storage system 140 may comprise a disk, tape, integrated circuit, RAM, ROM, network storage, server, or other memory function. Storage system 140 may be a computer readable medium. Storage system 140 may be distributed among multiple memory devices.

Processing systems 131-133 retrieve and execute software 150 from storage system 140. Processing systems 131-133 may retrieve and store data 170. Processing systems 131-133 may also retrieve and store data via communication interface 120. Processing systems 131-133 may create or modify software 150 or data 170 to achieve a tangible result. Processing systems 131-133 may control communication interface 120 or user interface 170 to achieve a tangible result. Processing systems 131-133 may retrieve and execute remotely stored software via communication interface 120.

Software 150 and remotely stored software may comprise an operating system, utilities, drivers, networking software, and other software typically executed by a computer system. Software 150 may comprise an application program, applet, firmware, or other form of machine-readable processing instructions typically executed by a computer system. When executed by one or more of processing systems 131-133, software 150 or remotely stored software may direct computer system 100 to operate as described herein.

In an embodiment, computer system 100 uses the concept of tree based region locking to synchronize access to critical sections of the code, data and cache, or synchronize any critical hardware that needs sequential access. Other region locking mechanism may also be used either alone, or in combination with the aforementioned tree based region locking. Computer system 100 may use one or more region maps to maintain associations of critical resources with corresponding lock ranges. Computer system 100 may synchronize dependant tasks to execute them atomically.

In an embodiment, computer system 100 uses region locks. A region lock is a method by which a task being run by computer system 100 that affects a given range of a resource can block processing other commands or instructions that accesses an overlapping range of that resource. Examples of types of resources that computer system 100 may use region locks to synchronize access to include, but are not limited to, flash, cache, global buffers, etc.

Types of region locks include EXCLUSIVE region locks and other non-EXCLUSIVE region locks. A non-EXCLUSIVE (or shared) region locks a resource, and is blocked, by any overlapping non-EXCLUSIVE region locks of a different type for the same resource, and by any overlapping EXCLUSIVE region locks. A non-EXCLUSIVE region lock does not block and is not blocked by other non-EXCLUSIVE region locks of the same type. An EXCLUSIVE region lock blocks all overlapping region lock requests of all types. It should be understood that a process is put into the blocked state if it requests something for which it must wait. In other words, when a region lock blocks a resource other requests for a region lock to that resource wait rather than allowing the requesting process to continue.

In an embodiment, firmware in computer system 100 may use an existing infrastructure of region locks associated with storage system 140. In particular, if storage system 140 includes RAID functionality, computer system 100 may use the existing region lock software, hardware, and/or configuration in order to implement region locks for other resources of computer system 100.

In an embodiment, region locking on computer system 100 processes region lock requests as follows:
A) If a region lock is requested and there are no overlapping region locks in the region lock tree, the lock will be granted, regardless of type.
B) If a region lock of type EXCLUSIVE has been granted but not yet released, any subsequent overlapping region lock requests, regardless of type, will not be granted and will remain pending until the overlapping granted exclusive region lock is released.
C) If a granted region lock is any type other than EXCLUSIVE, any subsequent overlapping region lock of a different type than the granted lock will not be granted, and will remain pending until the granted lock is released.
D) If a granted region lock is any type other than EXCLUSIVE, subsequent overlapping region lock requests of the same type will be granted.

AVL trees may be used for region locking as described above. The primary function of AVL trees is to provide rapid look-up of a node entry based on a key that maps the entries in the tree into an ordered set. Region locks use the first Logical Block Address (LBA) in a range of blocks accessed an active resource request as the look-up key. Each class of resource (e.g., system resources, dummy target devices, RAID volumes, etc.) has its own AVL tree to manage region locks and hence the order of access to that resource.

In an embodiment, computer system 100 defines a regions lock tree for synchronization. Computer system 100 may define a dummy target (similar to, and addressed using LBAs like, a RAID volume) on which region locks may be taken. In an embodiment, only one dummy target for all shared resources is used. This is for effective resource utilization and easy management of the region lock tree associated with non-RAID resources managed by the dummy target. Only one region lock tree per target is used. Hence only one region lock tree is necessary for synchronization of all shared resources in the system.

For resource synchronization, computer system 100 may define a region map which will contain a table of LBAs—one LBA per resource (similar to an LBA range that a RAID volume takes a lock in RAID storage region lock implementations) that will act as a lock for the shared resource. FIG. 3 is an illustration of a region map.

In an embodiment, a processing system 131-133 that wants to use a resource requests an EXCLUSIVE region lock on the LBA that corresponds to that particular resource. This correspondence is defined in the region map. The region lock request will be inserted as a node in the region lock tree for the dummy target. If there is no other conflicting lock existing on the tree, (i.e. if any other processing system 131-133 has not already requested a region lock for the same resource), the region lock request will be immediately granted to the processing system 131-133 that initiated the region lock request. Until the processing system 131-133 currently holding the region lock releases the lock, no other processing system 131-133 will be granted a lock on this resource. If there is any other conflicting request already on the region lock tree, (i.e. if any other processing system 131-133 is already holding the lock) the region lock request will be inserted in the tree, but will not be granted. Once the processing system 131-133 currently holding the lock releases the region lock, any pending region lock requests for this resource will be processed in the order they are inserted. This helps ensure that only one processing system 131-133 holds exclusive usage of a shared resource at any point in time.

Figure 2:
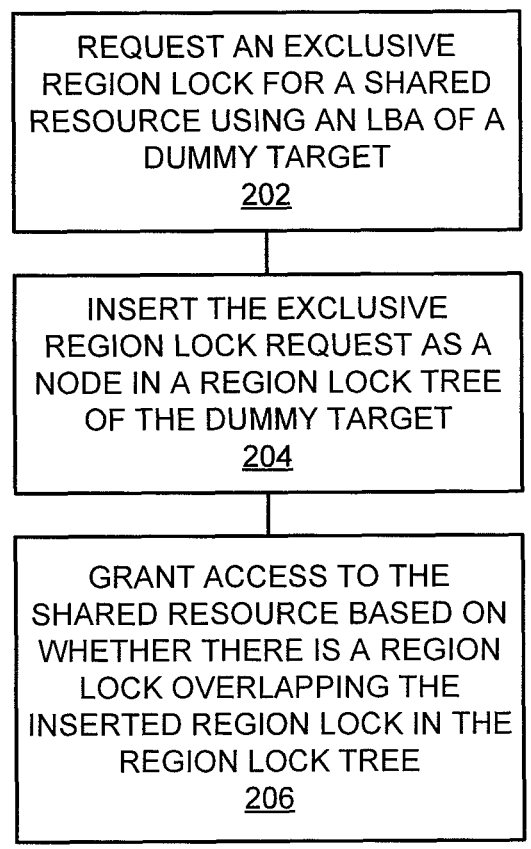
FIG. 2 is a flowchart of a method of region locking for a multiprocessor system.

FIG. 2 is a flowchart of a method of region locking for a multiprocessor system. The steps illustrated in FIG. 2 may be performed by one or more elements of computer system 100. An exclusive region lock is requested for a shared resource using an LBA of a dummy target (202). For example, processing system 131 may request an exclusive lock on a shared resource (e.g., I/O resource, NVRAM, global buffer, etc.) using an LBA of a dummy target. Processing system 131 may determine the LBA of the dummy target to request using an association stored in a region map that associates shared resources to LBAs of the dummy target (as in FIG. 3).

The exclusive region lock request is inserted as a node in a region lock tree of the dummy target (204). For example, processing system 131 may insert the exclusive region lock request into an AVL region lock tree associated with the dummy target. Processing system 131 may insert a node associated with the LBA it determined was associated with the shared resource region lock it is requesting.

Access is granted to the shared resource based on whether there is a region lock overlapping a region lock in the region lock tree (206). For example, processing system 131 may receive access to a shared resource based on whether the region lock inserted in step 204 overlaps an existing region lock in the region lock tree. The operation of computer system 100, and the steps and conditions illustrated in FIG. 2, described above, are further illustrated with reference to FIGS. 4-8.

Figure 4:
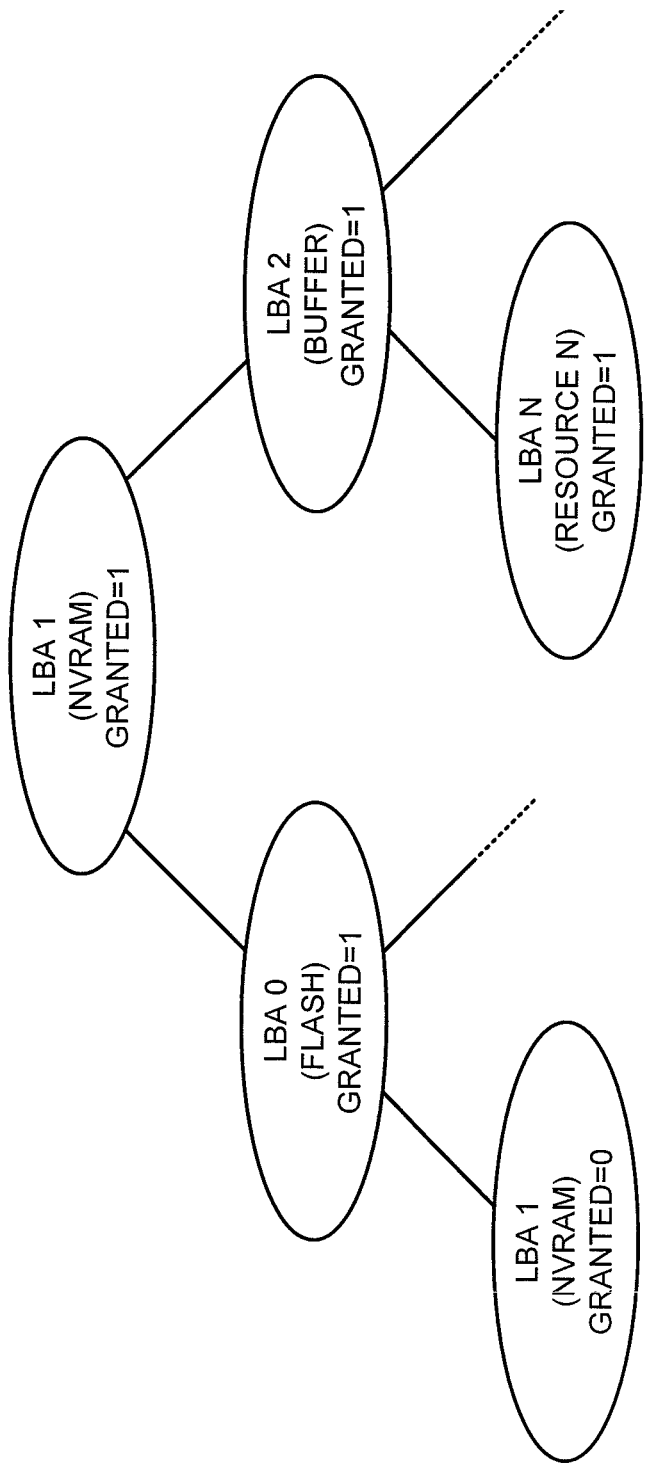
FIGS. 4-7 are illustration of region lock trees.

FIGS. 4-7 are illustration of region lock trees. In FIG. 4, multiple region locks for multiple shared resources are shown in the region lock tree as active at the same time. If there is no conflicting lock (as is the case for the granted LBA 1, the ungranted LBA1, LBA2 and LBA n in FIG. 4), new region lock requests are granted to the requesting processing system 131-133 immediately. A first request to LBA 1 would be granted immediately since there was no conflicting lock. However, a second lock request for LBA 1 would not granted since there would then be an already granted conflicting region lock request on LBA 1. When the first lock gets released by the processing system 131-133 which owned it, the second region lock request would be granted.

In an embodiment, the dummy target and associated region lock tree may be used to synchronize dependant tasks that need to be executed atomically across multiple threads or multiple processing systems 131-133. For example, starting with the region lock tree illustrated in FIG. 4, if a processing system 131-133 needs access flash and needs to update a global buffer, the processing system 131-133 will need to acquire an exclusive lock for 2 LBAs. This region lock request will not be granted until both the resources are free (i.e. both resources don't have any outstanding granted region lock in the region lock tree.) When there is no conflict, the region lock request will be granted. For example, if a processing system 131-133 wants to use NVRAM and the global buffer atomically, it can request an exclusive lock for both LBA 1 and 2. This request will not be granted if there is any lock already granted for either the NVRAM or the global buffer. The lock will be granted only when any outstanding locks on both NVRAM and the global buffer are released.

Figure 5:
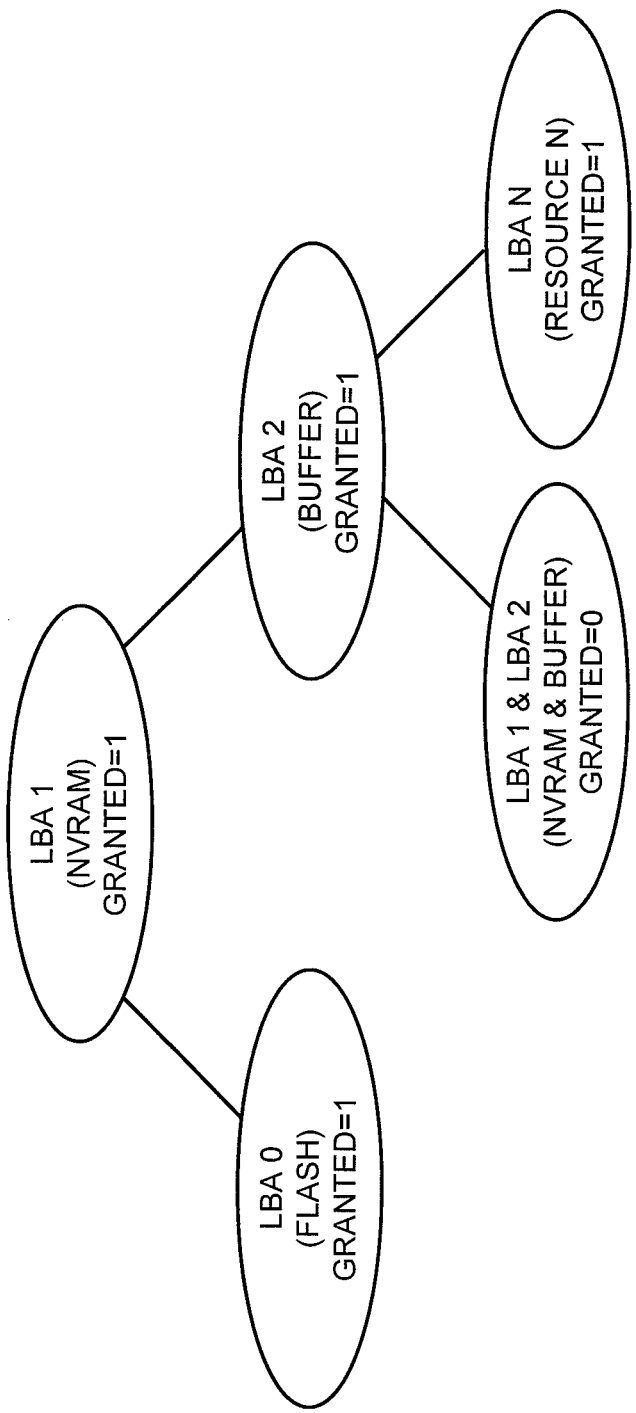

This above situation is illustrated by the region lock tree shown in FIG. 5. A region lock request for LBA 1 and LBA 2 (i.e., NVRAM and buffer) would not be granted by computer system 100 because there are outstanding conflicting requests that are already in a granted state.

Figure 6:
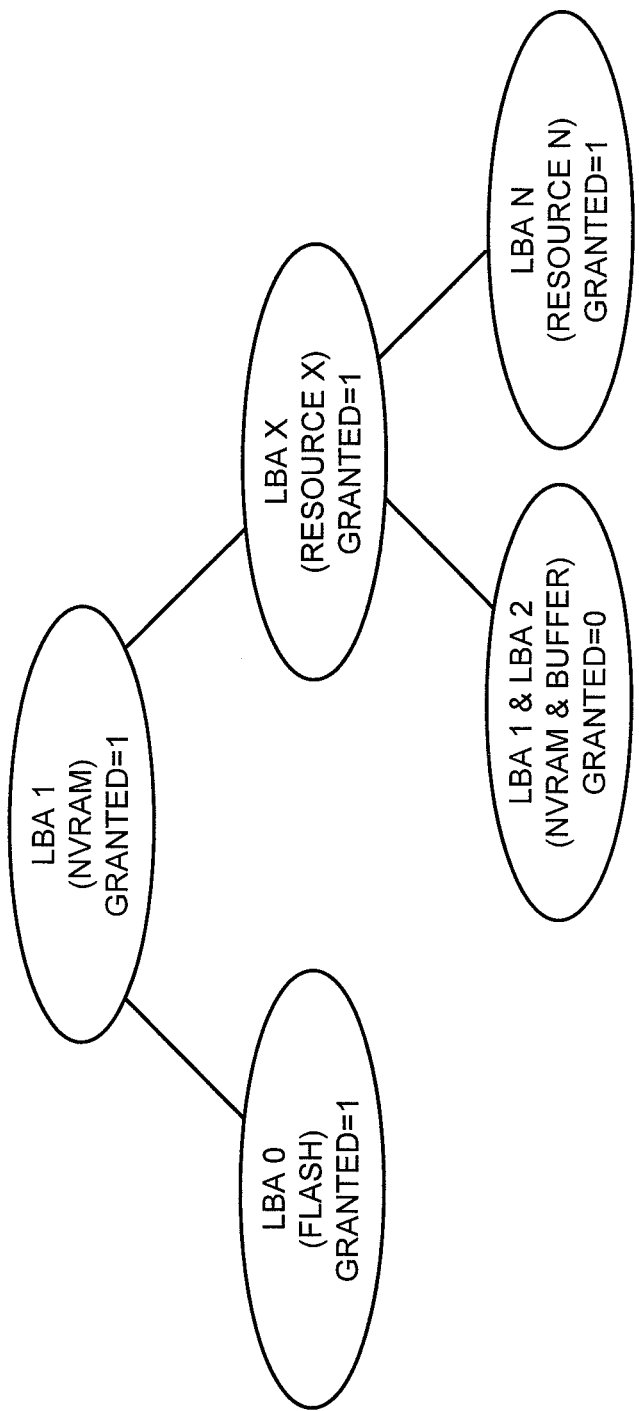

FIG. 6 illustrates the region lock tree where computer system 100 would not grant a region lock request for LBA 1 (NVRAM), even though one of the resources (i.e., buffer, LBA 2) is free. Computer system 100 would not grant the region lock request for NVRAM because there is a conflicting region lock request already granted for LBA 1 (NVRAM).

Figure 7:
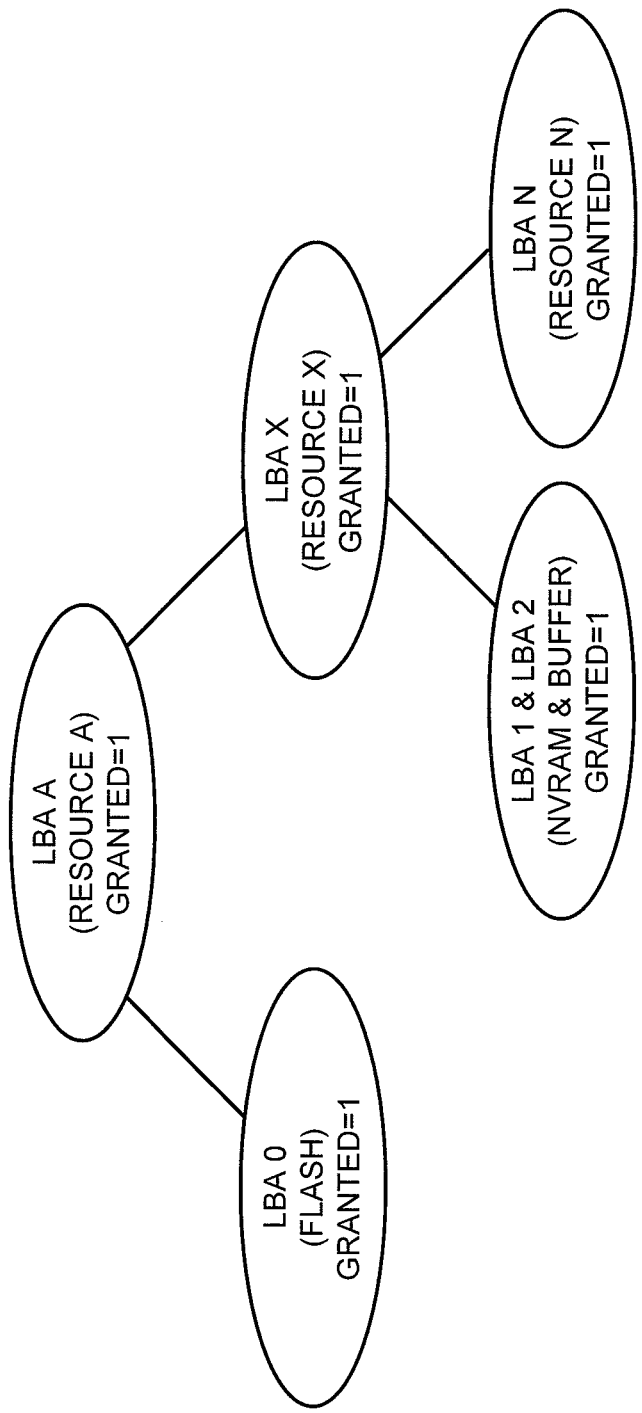
Figure 8:
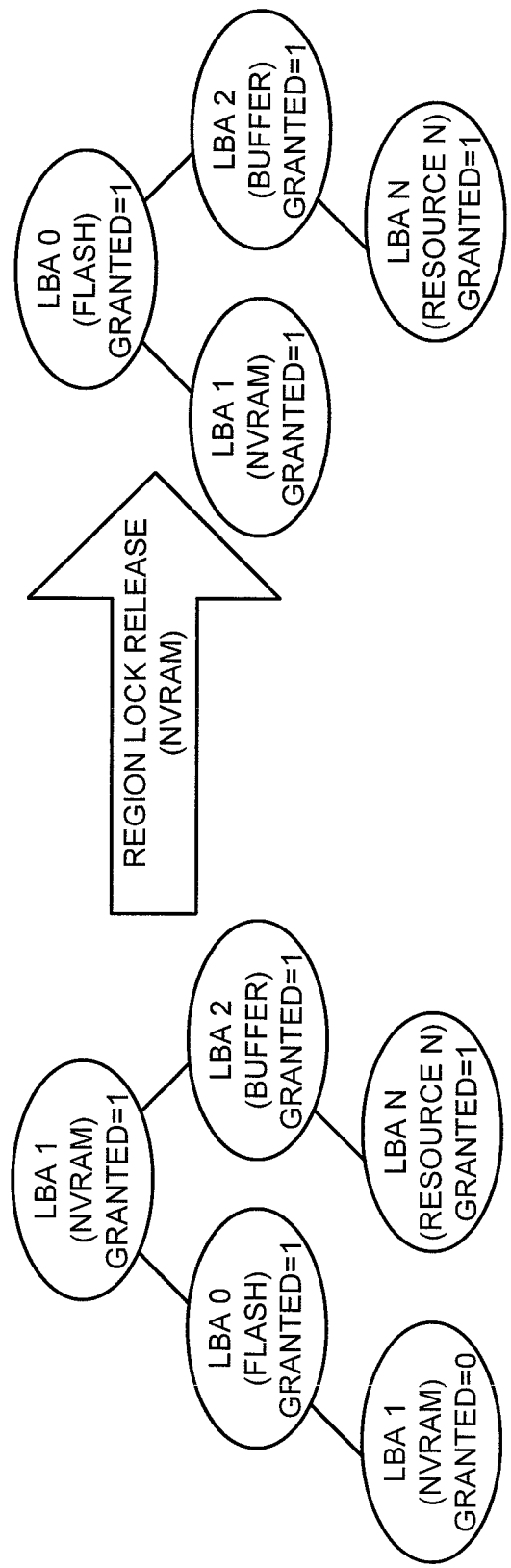
FIG. 8 is an illustration of a region lock before and after lock release.

FIG. 7 illustrates the region lock tree situation where computer system 100 would grant a region lock request for LBA 1 (NVRAM) and LBA 2 (buffer) because there are no conflicting region locks in the region lock tree. FIG. 8 is an illustration of a region lock before and after lock release. Shown in FIG. 8, is the release of a region lock for LBA 1 (NVRAM) that is at the root of the region lock tree. Since there is an outstanding region lock request for LBA 1 (NVRAM) that is not granted in the region lock tree, that outstanding region lock request is granted and the region lock tree is rebalanced to remove the original node associated with the granted region lock request that is released.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of synchronizing a plurality of processors' accesses to at least one shared resource, comprising:
   requesting, by one of said plurality of processors, an exclusive region lock for a shared resource using a logical block address (LBA) of a dummy target, said LBA defined in a region map that contains at least one LBA, the at least one LBA in said region map associated with said shared resource;
   inserting said exclusive region lock request as a node in a region lock tree of said dummy target; and,
   granting one of said plurality of processors access to said shared resource based on a determination whether there is a first existing region lock in the region lock tree that is overlapping with said exclusive region lock request.

2. The method of claim 1, wherein all of said plurality of processors request exclusive region locks for said shared resource using the same LBA of said dummy target.

3. The method of claim 1, wherein said region map associates shared resources with corresponding lock ranges.

4. The method of claim 1, further comprising:
   requesting, by one of said plurality of processors, an exclusive region lock for a second shared resource using a second LBA of said dummy target, said second LBA defined in said region map that contains a second at least one LBA, the second at least one LBA in said region map associated with said second shared resource.

5. The method of claim 4, further comprising:
   inserting said second exclusive region lock request as a second node in said region lock tree of said dummy target.

6. The method of claim 5, further comprising:
   granting one of said plurality of processors access to said shared resource based on a determination whether there is a second existing region lock on the region lock tree that is overlapping with said second exclusive region lock request.

7. The method of claim 5, further comprising:
   granting one of said plurality of processors access to said shared resource based on a determination whether there is a first existing region lock on the region lock tree that is overlapping with said exclusive region lock request and whether there is a second existing region lock on the region lock tree that is overlapping with said second exclusive region lock request.

8. The method of claim 1, wherein said shared resource comprises nonvolatile memory.

9. The method of claim 1, wherein said shared resource comprises resources used by input/output (I/O) operations.

10. A computer system, comprising:
    a plurality of processors configured to access at least one shared resource by requesting an exclusive region lock for a shared resource using a logical block address (LBA) of a dummy target;
    a region map containing said LBA and configured to contain a plurality of LBAs, said region map configured to associate said LBA with said shared resource;
    a region lock tree of said dummy target configured to receive said exclusive region lock request as a node in said region lock tree of said dummy target; and,
    said plurality of processors configured to receive access to said shared resource based on a determination whether there is a first existing region lock in the region lock tree that is overlapping with said exclusive region lock request.

11. The computer system of claim 10, wherein all of said plurality of processors request exclusive region locks for said shared resource using the same LBA of said dummy target.

12. The computer system of claim 10, wherein said region map associates shared resources with corresponding LBA ranges.

13. A computer readable medium having instructions stored thereon for synchronizing a plurality of processors accesses to at least one shared resource that, when executed by a computer, at least instruct the computer to:
    request, by one of said plurality of processors, an exclusive region lock for a shared resource using a logical block address (LBA) of a dummy target, said LBA defined in a region map that contains at least one LBA, the at least one LBA in said region map associated with said shared resource;
    insert said exclusive region lock request as a node in a region lock tree of said dummy target; and,
    grant one of said plurality of processors access to said shared resource based on a determination whether there is a first existing region lock on the region lock tree that is overlapping with said exclusive region lock request.

14. The computer readable medium of claim 13, wherein all of said plurality of processors request exclusive region locks for said shared resource using the same LBA of said dummy target.

15. The computer readable medium of claim 13, wherein said region map associates shared resources with corresponding LBA ranges.

16. The computer readable medium of claim 13, wherein the computer is further instructed to:
request, by one of said plurality of processors, an exclusive region lock for a second shared resource using a second LBA of said dummy target, said second LBA defined in said region map that contains a second at least one LBA, the second at least one LBA in said region map associated with said second shared resource.

17. The computer readable medium of claim 16, wherein the computer is further instructed to:
insert said second exclusive region lock request as a second node in said region lock tree of said dummy target.

18. The computer readable medium of claim 17, wherein the computer is further instructed to:
grant one of said plurality of processors access to said shared resource based on a determination whether there is a second existing region lock on the region lock tree that is overlapping with said second exclusive region lock request.

19. The computer readable medium of claim 17, wherein the computer is further instructed to:
grant one of said plurality of processors access to said shared resource based on a determination whether there is a first existing region lock on the region lock tree that is overlapping with said exclusive region lock request and whether there is a second existing region lock on the region lock tree that is overlapping with said second exclusive region lock request.

* * * * *